No. 697,663. Patented Apr. 15, 1902.
J. ROSBOROUGH.
CRACKER MACHINE.
(Application filed Feb. 17, 1902.)
(No Model.) 2 Sheets—Sheet 2.
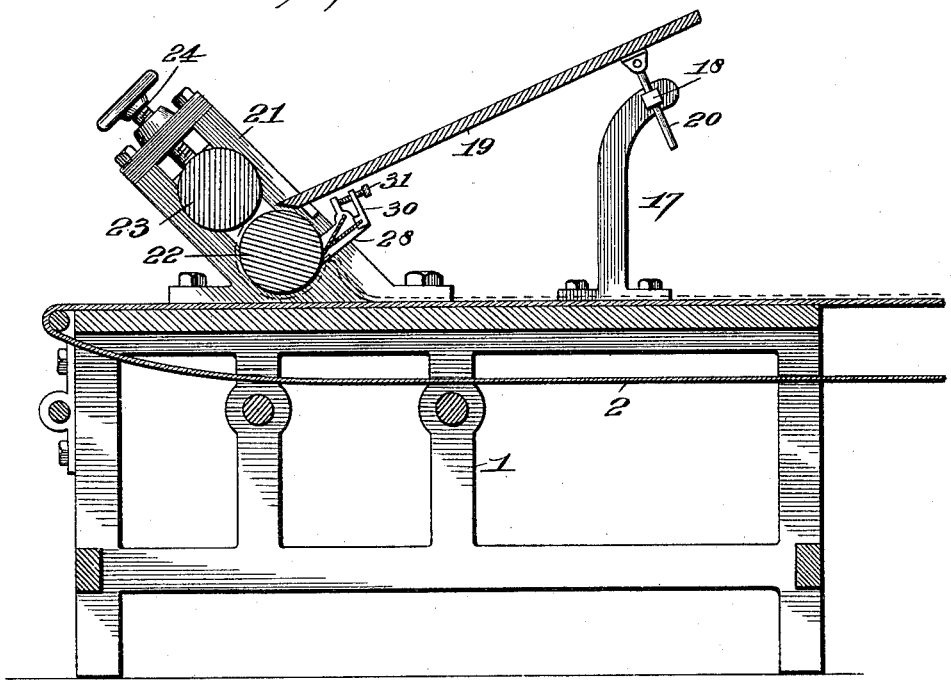
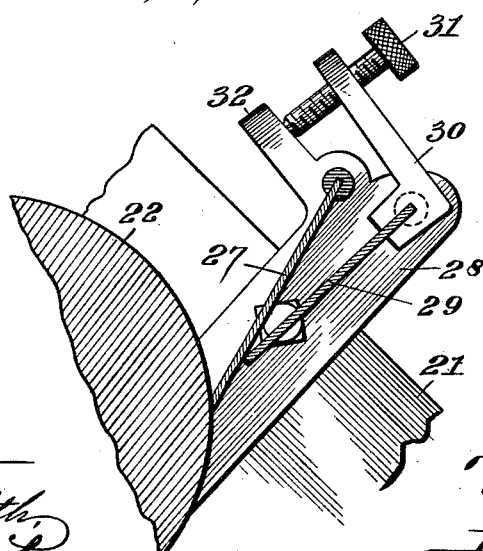
Inventor
John Rosborough;
By Wright Bro
atty's
attest:—
M. F. Smith
E. S. Knight

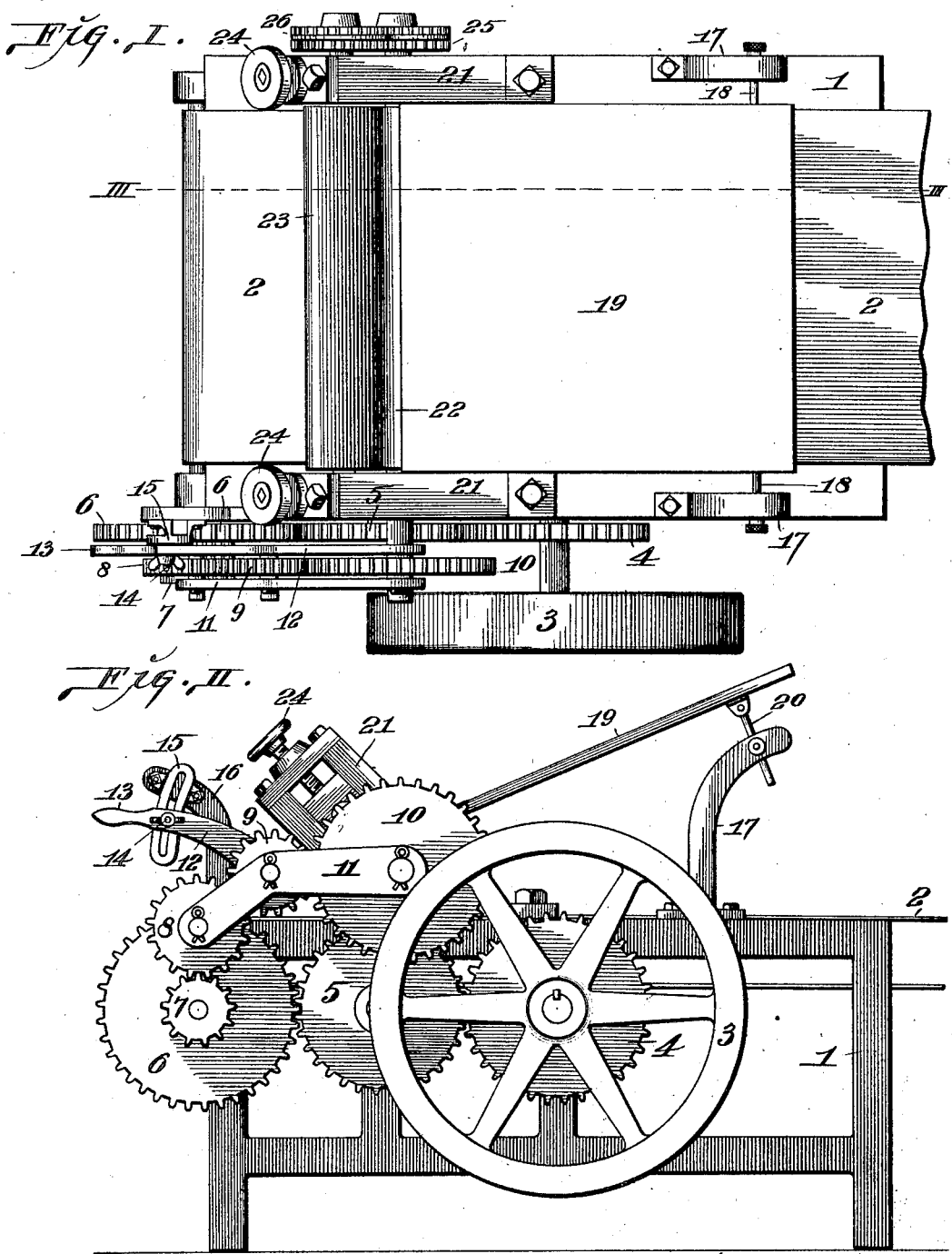

UNITED STATES PATENT OFFICE.

JOHN ROSBOROUGH, OF ST. LOUIS, MISSOURI.

CRACKER-MACHINE.

SPECIFICATION forming part of Letters Patent No. 697,663, dated April 15, 1902.

Application filed February 17, 1902. Serial No. 94,422. (No model.)

*To all whom it may concern:*

Be it known that I, JOHN ROSBOROUGH, a citizen of the United States, residing in the city of St. Louis, in the State of Missouri, have invented certain new and useful Improvements in Cracker-Machines, of which the following is a full, clear, and exact description, reference being had to the accompanying drawings, forming part of this specification.

My invention relates to that class of machines used for rolling dough into a thin sheet for the manufacture of crackers.

In the process of manufacturing crackers by machinery as heretofore practiced the dough has been delivered to the rolling-rolls and conveyed therefrom to the dough-cutters in a direct line, and in this practice it has been necessary to sprinkle flour-dust upon the top surface of the dough and also to convey the dough over flour-dust in order to prevent the adhesion thereof to the rolling-rolls and the carrier by which the dough after being rolled is conducted to the cutters of the machine. This practice has occasioned the constant application of flour-dust to both sides of the dough as it is rolled and conveyed to the cutters, a practice that is objectionable for two reasons—viz., the expense attached to the use of the flour-dust and the detriment to the appearance of the baked product occasioned by the presence of the coating of flour on the top surface of the crackers, resulting in the crackers becoming browned in baking them instead of their baking in a clear white condition, as is desirable.

In the machine constructed in accordance with my present invention I provide for the delivery of the dough to the rolling-rolls in a direction the reverse of that in which the dough is conveyed away from the rolls to the dough-cutters that cut the dough into the form of the crackers to be subsequently baked. The object of this construction is to present what is subsequently the lower side of the sheet of dough uppermost as it is rolled instead of lowermost, as in machines of the same class as heretofore constructed, and by this manner of rolling the dough dispense with the necessity for application of flour-dust to the top surface of the sheet of dough, and consequently the top surface of crackers when produced.

The invention consists in features of novelty hereinafter fully described, and pointed out in the claims.

Figure I is a top or plan view of the rolling end of a cracker-machine constructed in accordance with my invention. Fig. II is a side elevation of the machine. Fig. III is a vertical longitudinal sectional view taken on line III III, Fig. I. Fig. IV is an enlarged detail sectional view of the scraper-knife that acts to remove the dough from the lower dough-rolling roll.

1 designates the frame of the machine, on which the carrier-apron 2 operates to convey the sheet of rolled dough from the rolling-rolls to the cutters (not shown) of the machine.

3 designates the drive-pulley, to which power is applied to operate the parts of the machine. On the shaft of the drive-pulley 3 is a gear 4. 5, 6, 7, 8, 9, and 10 are gears arranged in train and driven by the gear 4. The gears 8 and 9 are mounted in a rocker composed of plates 11 and 12, the said gears being removably mounted in said rocker, so as to provide for their extraction and the introduction of gears of varied size to produce variable speed in the rotation of the gear 10. The rocker-plate 12 is provided with a handle 13, that is held in a fixed position by a set-bolt 14, arranged in a slotted arm 15, carried by a standard 16, surmounting the frame 1 of the machine.

17 designates standards mounted on the machine-frame forward of the parts heretofore referred to, and supported in said standards is a cross-rod 18.

19 is a dough-receiving table supported above the standards 17 and upheld by pins 20, attached to the table and seated in the cross-rod.

21 designates standards mounted on the machine-frame 1, and positioned in these standards is a lower roll 22 and an upper roll 23, between which the dough is passed to be reduced by said rolls to a thin sheet and delivered therefrom onto the carrier-apron 2 of the machine.

24 designates adjustment-screws by which the boxes of the upper roll 23 are moved to obtain the proper adjustment of said roll with relation to the lower roll 22.

The lower roll 22 is driven by power communicated to the gear 10, which is mounted on the shaft of said roll, and power is transmitted to the upper roll 23 from the lower roll through the medium of pinions 25 and 26. (See Fig. I.) The roll-supporting standards 21 extend rearwardly in an inclined direction parallel with each other, and the rolls 22 23 are arranged to rotate therein in a direction to convey the dough rearwardly from the rolls as it is delivered thereto from the inclined table 19 and rolled into sheet form. As the dough passes to the rolls from the inclined table 19 it is sprinkled with flour-dust to a sufficient extent to prevent its adhering to the upper roll 23; but no flour-dust is applied to the lower surface of the dough, and it consequently adheres to the lower roll 22. In order to separate the dough from the lower roll 22, I utilize a scraper-knife 27, that bears against the roll and is pivotally mounted in bracket-arms 28, attached to the standards 21. The scraper-knife 27 is adjustably held to the roll 22 by a plate 29, carried by a pivot-arm 30, that is pivoted to the arms 28 and contains a set-screw 31, arranged to bear against an extension 32 of the arm 28.

In the practical use of this machine the dough is reduced to a thin sheet on passing between the rolls 22 23, during which operation the top surface of the dough is slightly sprinkled with flour-dust, as stated, to prevent its adhering to the upper roll 23. As the dough passes around the lower roll 22 to a position beneath it it is separated from the roll by a scraper-knife 27, and the flour-coated surface of the dough that was previously uppermost falls lowermost onto the carrier-apron 2, while the uncoated surface, previously that against the lower roll 22, becomes uppermost on the carrier-apron. The sheet of dough is then conducted forwardly by the carrier-apron to the dough-cutter and formed to the proper shapes by said cutter for baking.

While I have described my machine as used for the manufacture of crackers, it is also serviceable in making small cakes and sweet goods of various kinds.

I claim as my invention—

1. In a cracker-machine, the combination of a pair of rolls, a carrier arranged to travel toward the forward end of the machine and extending rearwardly beyond the location of said rolls, and a delivery-table arranged forward of said rolls and from which the dough to be rolled is delivered to said rolls to pass therethrough in one direction and be deposited from said rolls onto said carrier in the opposite direction from that of its passage through the rolls, substantially as described.

2. In a cracker-machine, the combination of a pair of rolls, a carrier arranged to travel toward the forward end of the machine and extending rearwardly beyond the location of said rolls, a delivery-table arranged forward of said rolls and from which the dough to be rolled is delivered to said rolls to pass therethrough in one direction and be deposited from said rolls onto said carrier in the opposite direction from that of its passage through the rolls, and a knife adapted to bear against the lowermost of said rolls and separate the dough therefrom and cause it to fall upon said carrier beneath said roll, substantially as described.

JNO. ROSBOROUGH.

In presence of—
E. S. KNIGHT,
N. V. ALEXANDER.